Figure 1:
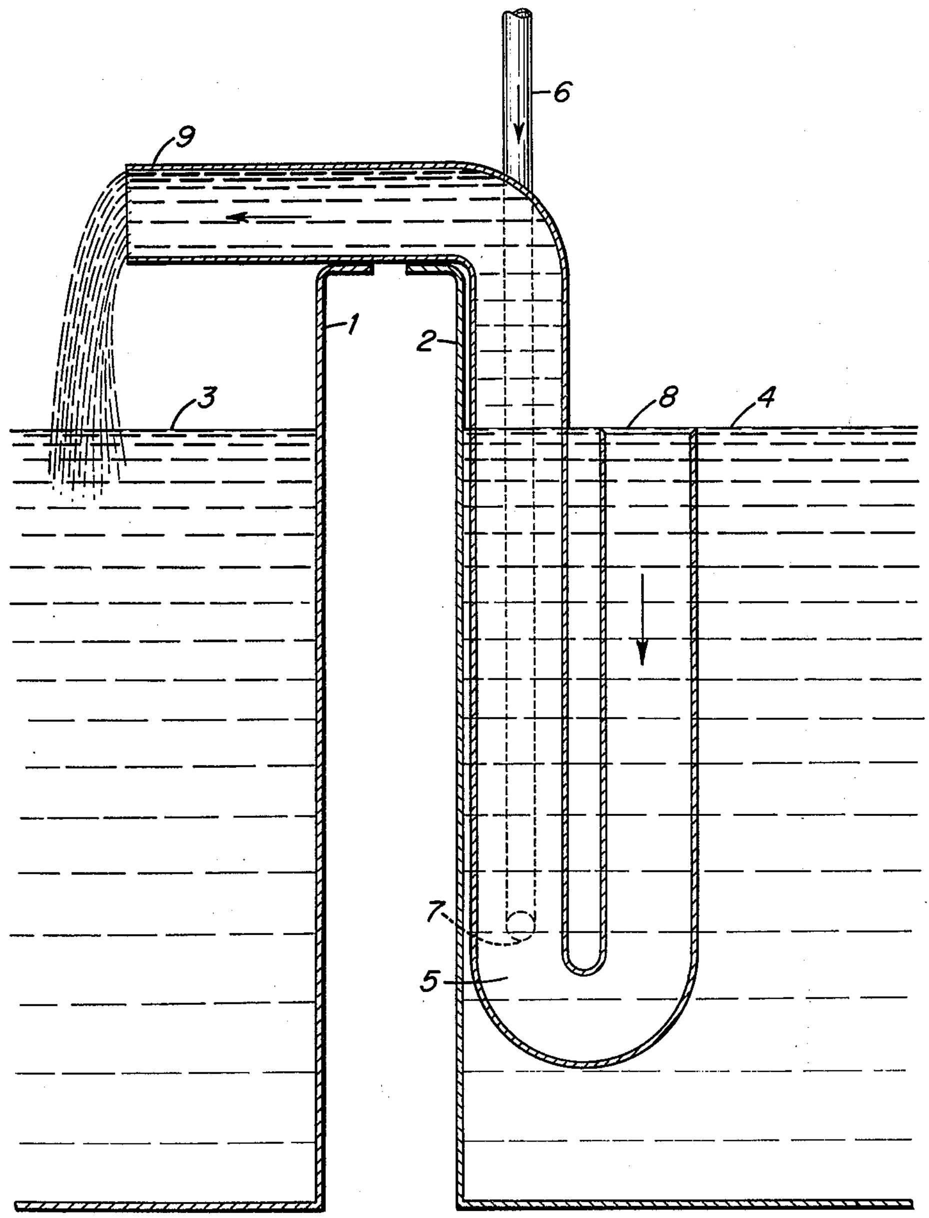

United States Patent [19]

Karlsson

[11] 4,030,521

[45] June 21, 1977

[54] METHOD FOR LIQUID LEVEL CONTROL

[75] Inventor: Tom Orvar Björn Karlsson, Floda, Sweden

[73] Assignee: Nordnero AB, Kungalv, Sweden

[22] Filed: May 14, 1975

[21] Appl. No.: 577,318

[30] Foreign Application Priority Data

May 16, 1974 Sweden .............................. 7406510

[52] U.S. Cl. ................................ 137/566; 137/571; 137/386

[51] Int. Cl.[2] .......................................... F04F 5/00

[58] Field of Search ........... 417/188; 137/571, 572, 137/577, 566

[56] References Cited

UNITED STATES PATENTS

| | | | |
|---|---|---|---|
| 1,447,614 | 3/1923 | Bright | 137/577 X |
| 2,399,634 | 5/1946 | Holland | 417/108 X |
| 3,444,821 | 5/1969 | Wolsh | 417/108 X |

*Primary Examiner*—Alan Cohan

[57] ABSTRACT

A method for use in surface treatment systems for maintaining a desired fluid level in the process and rinse tanks. The invention uses a dryrunning-safe pump, inserted in the tank. An overflow for the tank serves as an intake leading to the suction side of this pump. The pressure side of the pump is connected to an outlet outside the tank.

2 Claims, 2 Drawing Figures

15' 16 17 18 14 13 12 11 10

METHOD FOR LIQUID LEVEL CONTROL

This invention relates to a method used by the surface treatment industry for maintaining a desired fluid level in process and rinse tanks. Each tank is provided with a liquid supply means and with means for removing the excess liquid and transporting it to a place outside the tank. k One object of the invention is to provide for especially hard working conditions under which a level control means, in the plating industry, must work due to high temperatures in combination with the mechanic agitation and the presence of aggressive chemicals in the galvanic baths.

Further objects of the invention are to improve the function of the level controlling means, to improve its quality and to increase its adaptation. At the same time, an object is to provide a safer operation, and to reduce the maintenance required when compared to methods known before, in order to make the production process more efficient.

The development, within the galvanotechnics, has been directed in later years towards an increased automatization and also towards entirely closed systems or at least towards system for reducing the water consumption. These developments have resulted in increased demands on the liquid controlling means.

Thus, an object of the present invention is to provide a method which meets rigorous requirements in the above respect and which eliminates the disadvantages of known systems.

A further object of the present invention is to provide a method which reduces investment costs and gives improved service life, as compared with known systems using automatically controlled pumps or oveflows with check valves.

A further object of the invention is to provide a method which is capable of using the same fill level in all the tanks. This method is different from the systems using siphons or the overflow method.

A further object of the present invention is to eliminate the risks of backflow or diffusion whereby to occur responsive to the use of siphon and overflow, which leads to a declined efficiency.

A further object of the present invention is to provide a method having an improved operating security, as compared with known systems. Thus, the inventive system eliminates stoppages caused by dryrunning, due to functional disturbances of the automatic means conventionally used in connection with pumps for level control or stoppage caused by blocked flow in a siphon due, as when air is collected therein, for example.

A still further object of the present invention is to provide a method which is easily implemented and means which are easily replaceable and extensible, without intrusion, in the tanks or without taking other special installation steps.

According to the invention, the intake of the suction side of a dryrunning-safe pump is used as overflow for the tank the pressure side of which is connected to an outlet outside the tank.

Figure 2:
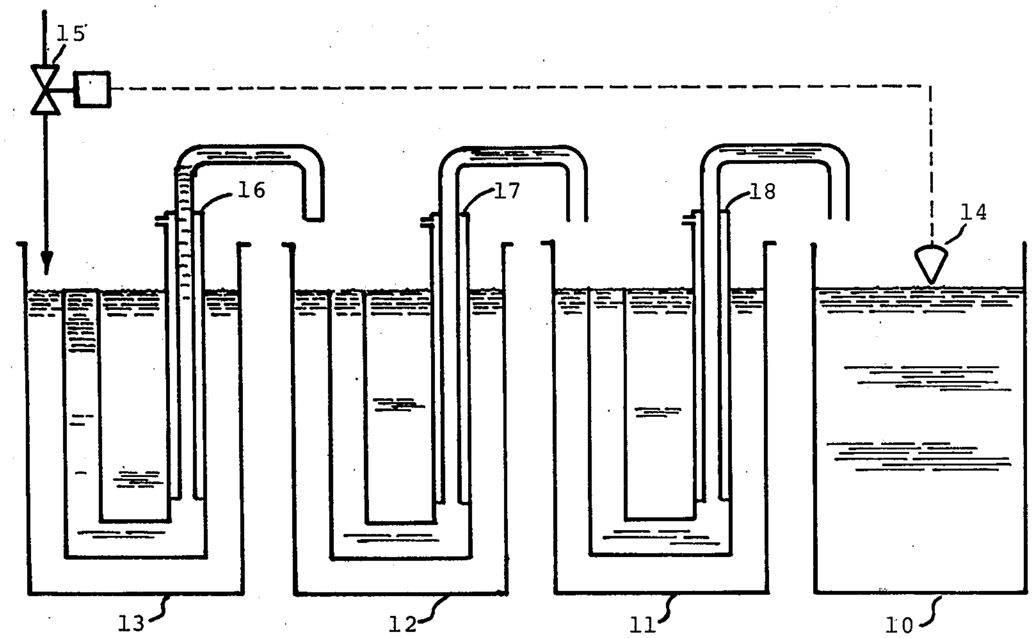

The above features of the invention will appear more fully hereinafter from the following detailed description when taken in conjunction with the accompanying drawing, in which:

FIG. is a side view, showing the inventive structure and method, in connection with two tanks in a plating process; and FIG. 2 is a schematic representation of a multi-bath succeeding system.

In FIG. 1, reference numbers 1 and 2 identify two rinse tanks, used in a line of tanks for a plating process. The liquid level of the tank 1 is designated 3 and the liquid level of the tank 2 is designated 4. In the described case the two levels 3 and 4 are the same.

In the tank 2 is inserted an air-lift or mammoth pump 5 which is substantially U-shaped. An air-line 6 conveys compressed air to an air inlet 7, which is a little bit above the bottom of the U. The pump is further provided with a liquid inlet 8, which also serves as the overflow for the tank 2. A liquid discharge line 9 for the pump ends a distance above the liquid level 3 of the tank 1.

The tanks 1 and 2 are parts of an entire process line having a first tank for a plating bath and thereafter several tanks for the rinse baths.

Only the last rinse tank has a supply of water and this supply is controlled by the solution level of the plating bath. When this level is too low, rinse water is supplied to the last rinse tank and is then transported from this tank to the next to last tank and therefrom to the next preceeding tank (i.e., two tanks from the end), and so on, as far as, the plating tank. Thus, the supply of the make-up water is delivered to the plating bath from the rinse, following immediately after the plating bath. This transport of water between two neighbouring tanks is accomplished by air-lift pumps similar to the one described and used between the tanks 2 and 1.

The pump construction contains a few tube parts of PVC and totally lacks movable parts, which gives a safe function, minimum maintenance, small investment costs, and a long life.

The means used in connection with the inventive method will be quite independent of the tank construction. Therefor it is flexible, without any requirement of special installation steps. There are no risks of any backflow since the outlet of the discharge line 9 (without any disadvantage) can be positioned at a safe distance above the actual liquid level.

FIG. 2 shows a surface treatment system comprising a processing tank 10 and three rinse tanks 11, 12, 13. The processing tank 10 may contain either acid or a plating bath, for example, and a three-step rinsing bath may fill the rinse tanks 11, 12 and 13. Of course, the rinsing can also be either a two-step using two separate tanks or a greater number of baths using more than three tanks. The level of the processing bath in tank 10 is sensed by any suitable level indicator 14, which controls a valve 15 and therefore the liquid supplied to tank 13. Usually, the liquid is water which rises in tank 13 to a level fixed by the intake to an air-lift pump 16. The excess water in tank 13 is pumped by air-lift pump 16 to tank 12. There the level rises to a level fixed by the intake to a second air-lift pump 17. Then, the excess water in tank 12 is pumped through the second air-lift pump 17 to tank 11. The excess water in tank 11 is then pumped through a third air-lift pump 18 to the processing tank 10. Thus, each air-lift pump has its intake on the desired liquid level of the preceeding tank, in which the pump is inserted.

The method according to the invention is quite independent of the automatic means which conventionally are required. The inventive method can be implemented by any pump device which is dryrunning-safe and is self-suctioning, (e.g. ejectors, tube pumps, screw pumps or self-suctioning centrifugal pumps, which is dry-running-safe). The suction side of the pump is connected to a U-shaped tube having an intake serving as the overflow of the tank.

I claim:

1. A system for maintaining desired liquid levels in each tank of a multi-tank processing line for treating materials, said system comprising a line of several tanks having at least one processing tank on one end of said line and at least one rinsing bath tank on the other end of said line, whereby material to be treated travels tank by tank from said processing tank toward said rinsing bath tank, means for initially supplying liquid to the last rinse tank of the line responsive to a control by the liquid level in the first processing tank of the line, a plurality of air-lift pumps, at least one of the pumps being located between each of two individually associated neighboring tanks in said line of tanks to transport the excess liquid of one tank to the immediately preceding tank, with the direction of liquid transport being from said rinse tank toward said processing tank, whereby said material to be treated travels through said line in one direction and said liquid is transported through said line in an opposite direction, the intake leading to the suction side of the associated one of said air-lift pumps forming an over flow level control in each of said tanks, and the pressure side of said air-lift pump being positioned to provide the inlet to the next preceding one of said tanks, whereby the liquid of each tank is maintained at a desired level without any danger of back flow from a preceding tank into a succeeding tank.

2. The system of claim 1 wherein each of said pumps comprises a U-shaped tube beginning at the desired overflow level, extending down into said tank and out over and above the desired level of liquid in said preceding adjacent tank, and means for introducing a pressurized gas into the U-shaped tube, above the bight of the U and on the output side of the tube.

* * * * *

UNITED STATES PATENT AND TRADEMARK OFFICE

CERTIFICATE OF CORRECTION

PATENT NO. : 4,030,521

DATED : June 21, 1977

INVENTOR(S) : TOM O. B. KARLSSON

It is certified that error appears in the above-identified patent and that said Letters Patent are hereby corrected as shown below:

Col. 1, Line 9, after "tank." eliminate "k"

Col. 1, Line 44, "whereby" should be --likely--

Col. 2, Line 1, "Fig." should be followed by --1--

Col. 2, Line 5, "succeeding" should be --processing--

Col. 2, Line 7, "used" should be after second "tanks"

Col. 2, Line 27, "preceeding" should be --preceding--

Col. 2, Line 40,"Therefor" should be --Therefore,--

Col. 2, Line 64, "preceeding" should be --succeeding--

Signed and Sealed this

*Eleventh* Day of *October 1977*

[SEAL]

*Attest:*

RUTH C. MASON
*Attesting Officer*

LUTRELLE F. PARKER
*Acting Commissioner of Patents and Trademarks*